G. W. KNOX.
ANIMAL POKE.
APPLICATION FILED DEC. 17, 1918.
1,322,120.
Patented Nov. 18, 1919.
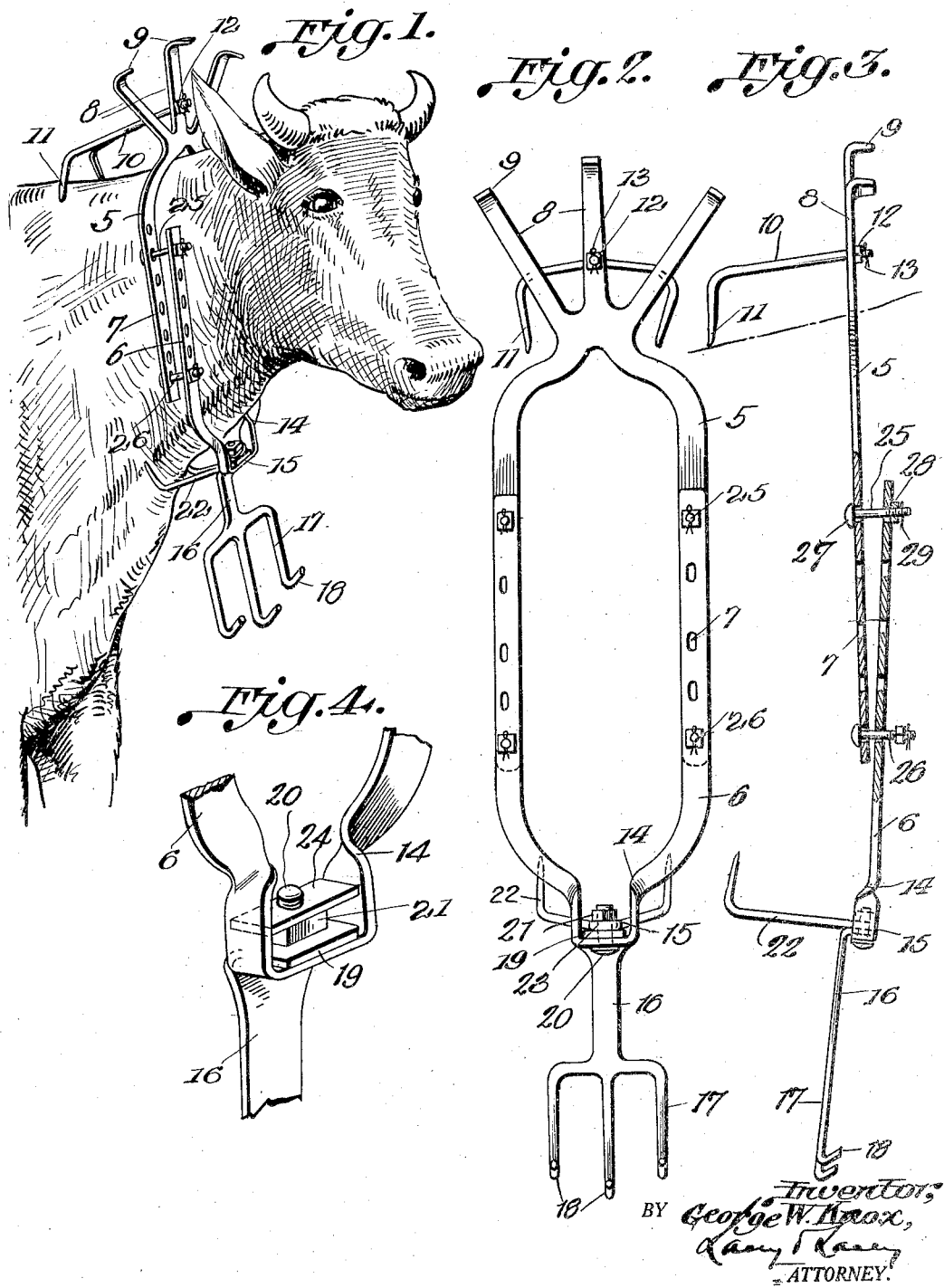

UNITED STATES PATENT OFFICE.

GEORGE W. KNOX, OF WINCHESTER, VIRGINIA.

ANIMAL-POKE.

1,322,120.  Specification of Letters Patent.  Patented Nov. 18, 1919.

Application filed December 17, 1918. Serial No. 267,179.

*To all whom it may concern:*

Be it known that I, GEORGE W. KNOX, a citizen of the United States, residing at Winchester, in the county of Frederick and State of Virginia, have invented certain new and useful Improvements in Animal-Pokes, of which the following is a specification.

This invention relates to animal pokes and has for its object to provide a comparatively simple and thoroughly efficient device of this character capable of being readily positioned on or detached from the neck of an animal and by means of which fractious cows and other live stock are effectually prevented from jumping over, passing through or breaking down fence wires and like barriers.

A further object of the invention is to provide an animal poke including coacting neck strap sections each provided with a pricking device and a plurality of wire-engaging spurs, the inner ends of said sections being overlapped and connected in such a manner as to allow limited tilting movement of one section with respect to the other so that when an animal attempts to pass over or through a fence, the spurs of one or the other of said sections will engage the fence wires and tilt said section, thereby causing the pricking devices to bite into the neck of the animal and arrest further progress thereof.

A further object is to provide an animal poke, the construction of which is such that either one of two sets of pricking devices may be employed, as desired.

A still further object is generally to improve this class of devices so as to increase their utility, durability and efficiency.

Figure 1 is a perspective view of a poke constructed in accordance with the present invention showing the same in position on the neck of an animal;

Fig. 2 is a front elevation of the animal poke detached;

Fig. 3 is a sectional side elevation showing the lower neck strap section tilted rearwardly with respect to the upper section to bring the lower pricking device into play;

Fig. 4 is a fragmentary detail perspective view showing the lower pricking device removed and the washer employed for holding the clamping nut against accidental displacement.

Corresponding and like parts are referred to in the following description and indicated in all the views of the drawings by the same reference characters.

The improved animal poke forming the subject-matter of the present invention comprises upper and lower neck sections 5 and 6, preferably formed of strap iron and having their inner ends overlapped and provided with registering perforations 7. The upper section 5 is provided with a plurality of radiating arms 8, preferably three in number, as shown, and having their free ends bent laterally to form angularly disposed wire-engaging lugs or spurs 9. The central arm 8 is preferably of greater length than the terminal arms and secured to said central arm near the base thereof, is a pricking device 10. The pricking device 10 comprises a shank having one end thereof bifurcated and extended downwardly to form depending spurs 11 adapted to bite into the neck of the animal. The threaded end of the shank extends through an opening in the central arm 8 and is retained in position thereon by a clamping nut 12 and in order to prevent displacement of said nut a cotter pin 13 is preferably extended through the threaded end of the shank, as best shown in Fig. 3 of the drawings. The metal constituting the lower neck section 6 is preferably given a half twist at 14 and thence extended downwardly on straight lines to form a substantially rectangular socket 15. Depending from the socket 15 is a wire-engaging device 16 provided with depending arms 17 also preferably three in number and having their ends bent laterally to form angularly disposed wire-engaging lugs 18. The shank of the wire-engaging device 16 is bent at substantially right angles thereto, to form an attaching ear 19 adapted to rest on the bottom of the socket 15. The bottom of the socket 15 is pierced by an opening to permit the passage of a securing bolt 20 which latter extends through a corresponding opening in the ear 19 for engagement with a clamping nut 21. Extending rearwardly from the socket 15 is an auxiliary pricking device 22 similar in construction to the pricking device 10 with the exception that the shank of the pricking device 22 is provided with an eye or loop 23 through which passes the clamping bolt 20 so that the bolt 20 not only serves to secure the wire-engaging member 16 in position on the lower neck section 6, but also serves to retain the auxiliary pricking device 22 in position thereon. When the poke is applied to unruly or fractious animals both the upper and lower pricking devices are used but under ordinary conditions the lower pricking device may be dispensed with in which event a washer 24 is threaded on the upper end of the bolt 20 to assist in preventing accidental displacement of the nut 21 and also to form a closure for the upper end of the socket 15, as best shown in Fig. 4 of the drawings.

As before stated, the inner ends of the upper and lower neck sections are overlapped and loosely passing through the perforations 7 in said inner ends are upper and lower securing bolts 25 and 26. The heads 27 of the bolts are preferably rounded so as to prevent cutting or lacerating the neck of the animal while the threaded ends of said bolts engage nuts 28 which latter are held against displacement by suitable cotter pins 29. It will thus be seen that the upper and lower sections 5 and 6 are free to move laterally with respect to each other so as to permit of a limited tilting movement but are held against complete separation by the bolts 25 and 26.

When the device is applied to the neck of an animal and the latter approaches a barb wire fence or other barrier, one of the wire-engaging members, for instance, the member 16 will bear against the adjacent strand wires of the fence and thus tilt the lower neck section 6 to the position shown in Fig. 3 of the drawings and in doing so will cause the spurs of the auxiliary pricking device 22 to bite into the neck of the animal and arrest further progress thereof. Conversely, if the spurs 9 on the upper neck section 5 bear against the wire fence strands the upper section 5 will be tilted laterally with respect to the lower section so as to cause the spurs 11 to bite into the neck of the animal. By reference to Fig. 3 of the drawings, it will be seen that the tilting movement of the lower section 6 is limited by engagement with the lower end of the upper section 5 and also by engagement with the clamping nut 28 of the upper bolt 25. It will be understood that when the lower section 6 is swung rearwardly incident to the impact of the member 16 with the fence wires, the upper end of said section will swing or fulcrum on the upper bolt 25 while the lower portion thereof will ride freely over the lower bolt 26 until it strikes the lower end of the upper section 5 and that when the upper section 6 is swung rearwardly by impact of the spurs 9 with the fence wires the upper section 5 will swing on the bolt 25 while the lower end thereof will slide freely over the lower bolt 26 until the lower end of the section 5 engages the adjacent face of the section 6 when pivotal or tilting movement of the upper section 5 will be arrested. By having a plurality of openings 7 formed in the overlapping ends of the neck yoke sections 5 and 6, the latter may be adjusted vertically with respect to each other so as to accommodate the necks of animals of different sizes. The devices may be made in different sizes and shapes and japanned or otherwise coated or treated to protect the same against the action of the elements.

Having thus described the invention, what is claimed as new is:

1. An animal poke comprising coacting neck sections having their outer ends closed and their inner ends open and overlapped and provided with registering perforations, the opposing faces of the neck sections at the overlapped ends thereof being smooth and unobstructed, wire engaging members carried by the closed outer ends of the neck sections, pricking devices also carried by the outer ends of said sections, and fastening devices extending through the registering perforations for permitting a limited tilting movement of one section with respect to the other.

2. An animal poke comprising coacting neck sections having their inner ends overlapped and loosely united, the opposing faces of the sections at the overlapped ends thereof being smooth and unobstructed and provided with registering perforations, wire engaging members carried by the outer ends of the neck sections, pricking devices also carried by the outer ends of said sections and spaced bolts passing loosely through the registering perforations and serving to hold said sections against lateral separation while at the same time permitting one section to have a limited tilting movement with respect to the other.

3. An animal poke comprising coacting neck sections having their inner ends overlapped and loosely united, the outer end of the lower section being provided with a substantially rectangular socket, wire-engaging arms extending longitudinally from the upper section, a pricking device carried by one of said arms, a wire-engaging device having an angularly disposed ear seated in said socket, an auxiliary pricking device resting on said ear, and a securing bolt passing through the ear, auxiliary pricking device and an opening in the wall of the socket for securing the parts in position on the lower neck section.

4. An animal poke comprising upper and lower sections having their inner ends overlapped and loosely united, said sections being each formed of a flat strip of metal, the metal constituting the lower section being bent to form a substantially rectangular socket at the lower end thereof, and the metal forming the upper section being extended to form a plurality of radiating wire-engaging arms terminating in angularly disposed lugs, a wire-engaging member depending from the socket and provided with an angularly disposed ear bearing against the wall of the socket, a clamping bolt extending through alined perforations in the ear and wall of the socket for engagement with a securing nut, and a pricking device carried by one of said arms.

5. An animal poke comprising upper and lower substantially U-shaped sections having their inner ends open and overlapped and each provided with a plurality of perforations, the perforations in one section registering with the perforations in an adjacent section, the opposing faces of the sections at the overlapped ends thereof being smooth and unobstructed, spaced upper and lower bolts extending loosely through certain of the perforations and permitting tilting movement of one section with respect to the other, wire engaging members carried by the outer ends of said sections, and pricking devices also carried by the outer ends of said sections, the tilting movement of one neck section being limited by engagement with the smooth face of the adjacent section.

In testimony whereof I affix my signature.

GEORGE W. KNOX. [L. S.]